(12) United States Patent
Francik et al.

(10) Patent No.: US 8,592,515 B2
(45) Date of Patent: Nov. 26, 2013

(54) TIRE WITH RUBBER COMPONENT

(75) Inventors: William Paul Francik, Bath, OH (US); John Joseph Andre Verthe, Kent, OH (US); Junling Zhao, Hudson, OH (US); George Frank Balogh, North Canton, OH (US); Christin Louise Alwardt, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 202 days.

(21) Appl. No.: 13/118,642

(22) Filed: May 31, 2011

(65) Prior Publication Data

US 2012/0029114 A1 Feb. 2, 2012

Related U.S. Application Data

(63) Continuation-in-part of application No. 13/113,214, filed on May 23, 2011, now abandoned.

(60) Provisional application No. 61/368,368, filed on Jul. 28, 2010.

(51) Int. Cl.
*B60C 1/00* (2006.01)
*C08K 5/01* (2006.01)
*C08L 9/00* (2006.01)
*C08L 9/06* (2006.01)

(52) U.S. Cl.
USPC .......... 524/526; 524/485; 525/192; 525/237; 152/151; 152/209.1

(58) Field of Classification Search
USPC .......... 523/156, 149, 150, 152, 153, 155, 157
See application file for complete search history.

(56) References Cited

U.S. PATENT DOCUMENTS

| | | | | |
|---|---|---|---|---|
| 5,508,333 A | * | 4/1996 | Shimizu | 524/424 |
| 5,877,249 A | * | 3/1999 | Lambotte | 524/493 |
| 6,046,266 A | * | 4/2000 | Sandstrom et al. | 524/492 |
| 6,429,245 B1 | * | 8/2002 | Francik et al. | 524/262 |
| 6,486,258 B1 | * | 11/2002 | Noguchi et al. | 525/191 |
| 7,019,084 B2 | * | 3/2006 | Sandstrom | 525/332.6 |
| 7,342,070 B2 | * | 3/2008 | Tsukimawashi et al. | 525/105 |
| 2002/0139461 A1 | * | 10/2002 | Pyle et al. | 152/209.5 |
| 2004/0054065 A1 | * | 3/2004 | Zanzig et al. | 524/525 |
| 2004/0249020 A1 | * | 12/2004 | Sandstrom et al. | 523/200 |
| 2006/0063878 A1 | * | 3/2006 | Sandstrom et al. | 524/492 |
| 2008/0027162 A1 | | 1/2008 | Hua et al. | 524/262 |
| 2010/0186859 A1 | * | 7/2010 | Zhao et al. | 152/209.5 |
| 2010/0186868 A1 | * | 7/2010 | Sandstrom et al. | 152/564 |
| 2010/0186869 A1 | * | 7/2010 | Sandstrom et al. | 152/564 |

FOREIGN PATENT DOCUMENTS

| | | | | |
|---|---|---|---|---|
| EP | 1398347 | | 3/2004 | C08L 9/06 |
| EP | 1559586 | | 8/2005 | B60C 1/00 |
| EP | 1640183 | | 3/2006 | B60C 1/00 |
| WO | 03029299 | | 4/2003 | C08C 19/25 |
| WO | WO2007/047943 | * | 4/2007 | |

OTHER PUBLICATIONS

European Search Report completed Oct. 5, 2011.

* cited by examiner

*Primary Examiner* — David Buttner
*Assistant Examiner* — Ha Nguyen
(74) *Attorney, Agent, or Firm* — Henry C. Young, Jr.

(57) ABSTRACT

Pneumatic rubber tire with a component comprised of a silica reinforced rubber composition comprised of specialized polybutadiene rubber, functionalized styrene/butadiene elastomer and cis 1,4-polyisoprene rubber.

16 Claims, No Drawings

TIRE WITH RUBBER COMPONENT

This application is a continuation-in-part of prior U.S. patent application Ser. No. 13/113,214, filed May 23, 2011, now abandoned, which claims the benefit of prior U.S. Provisional Application Ser. No. 61/368,368, filed Jul. 28, 2010.

FIELD OF THE INVENTION

Pneumatic rubber tire with a component comprised of a silica reinforced rubber composition comprised of specialized polybutadiene rubber, functionalized styrene/butadiene elastomer and cis 1,4-polyisoprene rubber.

BACKGROUND OF THE INVENTION

Pneumatic rubber tires are often desired to have treads of a rubber composition which will provide properties which include good traction on the road, resistance to tread wear and low rolling resistance. It has traditionally been difficult to improve one of such properties without sacrificing one or more of the other properties. Such properties depend, to a great extent, upon dynamic viscoelastic properties of elastomers used in making the tread rubber composition as well as viscoelastic properties of the rubber composition itself.

For example, elastomers, or rubber composition, presenting a higher rebound property can generally promote lower rolling resistance for a tire with a tread containing such elastomer(s) or rubber composition. For example, elastomers, or rubber composition, presenting a higher resistance to abrasion might generally promote greater resistance to tread wear for a tire tread containing such elastomer(s) or rubber composition. For example, elastomers, or rubber composition, having a higher glass transition temperature (Tg) may promote greater traction, or skid resistance, for as tire tread containing such elastomer(s) or rubber composition.

A challenge is presented to balance these three viscoelastic properties, which can be largely inconsistence properties in a sense that improving one of such properties may sacrifice one or more of the other two properties. The challenge is to evaluate specified combination of elastomers sometimes used in tire treads to achieve a beneficial balance of properties.

Traction emphasizing tread rubber typically exhibits a relatively high, single, glass transition temperature (Tg) of above −50° C. and usually within a range of from about zero to about −50° C.

For this evaluation, a rubber composition is evaluated which is comprised of a silica-rich filler reinforcement containing rubber composition comprised of a combination of elastomers of cooperative viscoelastic properties comprised of specialized polybutadiene rubber, functionalized styrene/butadiene rubber and cis 1,4-polyisoprene rubber.

In the description of this invention, terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, where referred to herein, represents an inflection point glass transition temperature(s) of the respective elastomer or elastomer composition in its uncured state or possibly a cured state in a case of an elastomer composition. A Tg can be suitably determined by a dynamic mechanical analyzer (DMA), an RSA III instrument from TA Instruments, which would be recognized by those having skill in such art, as well as, for example, a differential scanning calorimeter (DSC), at a temperature rate of increase of 10° C. per minute.

A resin's softening point (Sp) may be determined by ASTM D-28.

For this invention, the term "functionalized" relates to elastomers which contain at least one functional group which is reactive with hydroxyl groups (e.g. silanol groups) contained on precipitated silica reinforcement for the rubber composition.

DISCLOSURE AND PRACTICE OF THE INVENTION

In accordance with this invention, a rubber composition is provided comprised of, based upon parts by weight per 100 parts by weight of rubber (phr):

(A) elastomers comprised of:
  (1) from about 50 to about 80 phr of a solution polymerization prepared styrene/butadiene rubber functionalized with an alkoxysilane group and at least one functional group comprised of amine or thiol units and having a Tg in a range of from about −40 to about −10° C.;
  (2) from about 10 to about 40 phr of specialized polybutadiene rubber;
  (3) about 5 to about 40 phr of cis 1,4-polyisoprene rubber, preferably natural cis 1,4-polyisoprene rubber, having a Tg in a range of about −65 to about −70° C.;

(B) about 5 to about 20 phr of paraffinic/naphthenic rubber processing oil containing from about 30 to about 40 weight percent naphthenic oil and from about 45 to about 55 weight percent paraffinic oil and having a Tg in a range of from about −40 to about −60° C.;

(C) about 40 to about 110, alternatively about 50 to about 80, phr of reinforcing filler comprised of:
  (1) amorphous rubber reinforcing precipitated silica filler (precipitated silica), or
  (2) combination of said precipitated silica and rubber reinforcing carbon black where said filler contains from about 55 to about 75 weight percent of said rubber reinforcing carbon black, or
  (3) combination of said precipitated silica and rubber reinforcing carbon black where said filler contains up to 25 weight percent of said rubber reinforcing carbon black, or
  (4) combination of said precipitated silica and rubber reinforcing carbon black where said filler contains from about 15 to about 50 weight percent of said rubber reinforcing carbon black;

(D) optionally from about 2 to about 15 phr of styrene/alphamethylstyrene resin;

(E) coupling agent having a moiety (e.g. a siloxy moiety) reactive with hydroxyl groups (e.g.: silanol groups) contained on the surface of said precipitated silica and another moiety interactive with at least one of said conjugated diene-based elastomers, wherein said coupling agent is comprised of a bis-(3-ethoxysilylpropyl)polysulfide material having an average of from about 3 to about 4 connecting sulfur atoms in the polysulfide bridge;

wherein said specialized cis 1,4-polybutadiene rubber has a microstructure comprised of about 96 to about 98 percent cis 1,4-isomeric units, about 1 to about 3 percent trans 1,4-isomeric units and about 0.3 to about 1 percent vinyl 1,2-content; a number average molecular weight (Mn) in a range of from about 230,000 to about 250,000 with a heterogeneity index (Mw/Mn) in a range of from about 1.5/1 to about 2/1, and a Tg in a range of from about −104 to about −109° C.;

wherein said functionalized SBR has a bound styrene content in a range of from about 10 to about 50 percent, alternately in a range of from about 10 up to 30 percent;

wherein said styrene/butadiene rubber (SBR) is functionalized with an alkoxysilane group and at least one of amine group or thiol group, and wherein said styrene/alphamethylstyrene copolymer resin has a softening point (Sp) in a range of from about 80 to about 90° C. with a styrene content in a range of from about 10 to about 30 percent.

Where the styrene/alpha-methylstyrene resin is to be included in the rubber composition, a combination of said the specialized polybutadiene rubber may be used in amount ranging from about 15 to about 25 phr, the natural rubber in an amount ranging from about 5 to about 10 phr and the processing oil in amount ranging from about 5 to about 10 phr, if desired.

In further accordance with this invention, a pneumatic rubber tire is provided having a component comprised of a rubber composition comprised of, based upon parts by weight per 100 parts by weight of rubber (phr):

(A) elastomers comprised of:
(1) from about 50 to about 80 phr of a solution polymerization prepared styrene/butadiene rubber functionalized with an alkoxysilane group and at least one functional group comprised of amine or thiol units and having a Tg in a range of from about −40 to about −10° C.;
(2) from about 10 to about 40 phr of specialized polybutadiene rubber;
(3) about 5 to about 40 phr of cis 1,4-polyisoprene rubber, preferably natural cis 1,4-polyisoprene rubber, having a Tg in a range of about −65 to about −70° C.;

(B) about 5 to about 20 phr of paraffinic/naphthenic rubber processing oil containing from about 30 to about 40 weight percent naphthenic oil and from about 45 to about 55 weight percent paraffinic oil and having a Tg in a range of from about −40 to about −60° C.;

(C) about 40 to about 110, alternatively about 50 to about 80, phr of reinforcing filler comprised of:
(1) amorphous rubber reinforcing precipitated silica filler (precipitated silica), or
(2) combination of said precipitated silica and rubber reinforcing carbon black where said filler contains from about 55 to about 75 weight percent of said rubber reinforcing carbon black;

(D) optionally from about 2 to about 15 phr of styrene/alphamethylstyrene resin;

(E) coupling agent having a moiety (e.g. a siloxy moiety) reactive with hydroxyl groups (e.g.: silanol groups) contained on the surface of said precipitated silica and another moiety interactive with at least one of said conjugated diene-based elastomers;

wherein said specialized cis 1,4-polybutadiene rubber has a microstructure comprised of about 96 to about 98 percent cis 1,4-isomeric units, about 1 to about 3 percent trans 1,4-isomeric units and about 0.3 to about 1 percent vinyl 1,2-content; a number average molecular weight (Mn) in a range of from about 230,000 to about 250,000 with a heterogeneity index (Mw/Mn) in a range of from about 1.5/1 to about 2/1, and a Tg in a range of from about −104 to about −109° C.;

wherein said functionalized SBR has a bound styrene content in a range of from about 10 to about 50 percent (e.g. in a range of from about 10 up to 30, alternately from 30, namely extending from 30, to about 50 percent for a high styrene containing SBR);

wherein said styrene/butadiene rubber (SBR) is functionalized with an alkoxysilane group and at least one of primary amine group or thiol group, and wherein said styrene/alphamethylstyrene copolymer resin has a softening point (Sp) in a range of from about 80 to about 90° C. with a styrene content in a range of from about 10 to about 30 percent.

In practice, said coupling agent may be comprised of a bis-(3-ethoxysilylpropyl)polysulfide compound having an average of from about 2 to about 4, desirably from about 3.6 to about 4, alternately from about 2 to about 2.6, connecting sulfur atoms in the polysulfide bridge.

Where the styrene/alpha-methylstyrene resin is to be included in the rubber composition, a combination of said specialized polybutadiene rubber may be used in amount ranging from about 15 to about 25 phr, the natural rubber in an amount ranging from about 5 to about 10 phr and the processing oil in an amount ranging from about 5 to about 10 phr, if desired.

It is to be appreciated that said specialized polybutadiene rubber is significantly different from a polybutadiene rubber having a microstructure comprised of about 96 to about 99 percent cis 1,4-isomeric units, about 0.1 to about 1 percent trans 1,4-isomeric units and about 1 to about 3 percent vinyl 1,2-content; a much lower number average molecular weight (Mn) in a range of from about 75,000 to about 150,000 with a much higher heterogeneity index (Mw/Mn) in a range of from about 3/1 to about 5/1 produced with a nickel catalyst.

In particular, the specialized polybutadiene rubber for evaluation for use in this invention is likely be beneficially tougher because of its significantly higher weight average molecular weight.

For the functionalized styrene/butadiene rubber: In one embodiment, the styrene-butadiene rubber may be obtained by copolymerizing styrene and 1,3-butadiene characterized by having an amino group or thiol group and an alkoxysilyl group bonded to the polymer chain. In one embodiment, the alkoxysilyl group may be comprised of at least one of methoxysilyl group and ethoxysilyl group.

The amino group or thiol group may be bonded to any of a polymerization initiating terminal, a polymerization terminating terminal, a main chain of the styrene/butadiene rubber and as a side chain of the styrene/butadiene rubber, as long as the group is bonded to the styrene-butadiene rubber chain. However, the amino group or thiol group is preferably introduced to the polymerization initiating terminal or the polymerization terminating terminal, in that the disappearance of energy at a polymer terminal is inhibited to improve hysteresis loss characteristics of the rubber.

Further, the content of the alkoxysilyl group bonded to the polymer chain for the functionalized styrene/butadiene rubber is desirably from about 0.5 to about 200, alternately from about 2 to about 50, mmol/kg of the styrene/butadiene rubber.

The alkoxysilyl group may be bonded to any of the polymerization initiating terminal, the polymerization terminating terminal, the main chain of the styrene/butadiene rubber and the side chain to the styrene/butadiene rubber, as long as it is bonded to the styrene/butadiene rubber's polymer chain. However, the alkoxysilyl group is preferably introduced to the polymerization initiating terminal or the polymerization terminating terminal, in that the disappearance of energy is inhibited from the styrene/butadiene rubber terminal to be able to improve hysteresis loss characteristics of the rubber.

The functionalized styrene/butadiene rubber can be produced, for example, by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking of the protective group, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO2007/047943.

In one embodiment, and as taught in U.S. Pat. No. 7,342, 070, the functionalized styrene-butadiene rubber may be of the formula (I) or (II)

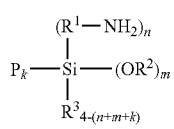

(I)

wherein P is a styrene/butadiene copolymer chain, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

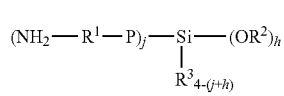

(II)

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis (trimethylsilyl)aminopropylmethyldimethoxysilane, 1-trimethylsilyl-2,2-dimethoxy-1-aza-2-silacyclopentane, N,N-bis (trimethylsilyl)aminopropyltrimethoxysilane, N,N-bis (trimethylsilyl)aminopropyltriethoxysilane, N,N-bis (trimethylsilyl)aminopropylmethyldiethoxysilane, N,N-bis (trimethylsilyl)aminoethyltrimethoxysilane, N,N-bis (trimethylsilyl)-aminoethyltriethoxysilne, N,N-bis (trimethylsilyl)aminoethylmethyldimethoxysilane, N,N-bis (trimethylsilyl)aminoethylmethyldiethoxysilane, etc., and preferred are 1-trimethylsilyl-2,2-dimethoxy-1-aza-2-silacyclopentane, N,N-bis(trimethylsilyl)aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III

$$RN-(CH_2)_xSi(OR')_3$$ (III)

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and x is an integer from 1 to 20. In one embodiment, at least one R group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

Styrene/butadiene rubbers functionalized with an alkoxysilane group and a primary amine group may be, for example, as HPR 355™ from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer, which may include a silane-sulfide modifier, represented by the formula IV

$$(R^4O)_xR^4_ySi-R^5-S-SiR^4_3$$ (IV)

wherein Si is silicon; S is sulfur; O is oxygen; x is an integer selected from 1, 2 and 3; y is an integer selected from 0, 1, and 2; x+y=3; $R^4$ is the same or different and is ($C_1$-$C_{16}$)alkyl; and R' is aryl, and alkyl aryl, or ($C_1$-$C_{16}$)alkyl. In one embodiment, $R^5$ is a ($C_1$-$C_{16}$)alkyl. In one embodiment, each $R^4$ group is the same or different, and each is independently a $C_1$-$C_5$ alkyl, and $R^5$ is $C_1$-$C_5$ alkyl.

Suitable styrene/butadiene rubbers functionalized with an alkoxysilane group and a thiol group may be, for example, SLR SE4602™ (formerly Dow Olefinverbund GmbH) which understood to be of the type of silane/thiol functionalized SBR described in WO2007/047943.

In practice, it is envisioned that the specialized polybutadiene elastomer may be prepared, for example, by polymerization of 1,3-polybutadiene monomer in an organic solvent solution in the presence of a catalyst system comprised of neodymium compound, an aluminum alkyl and an aluminum chloride delivering compound, and by treating the reaction mixture with, for example, a sulfur chloride such as, for example, disulfur dichloride as mentioned in U.S. Pat. No. 5,567,784, so long as it possesses the aforesaid microstructure, molecular weight and heterogeneity index. Representative of neodymium compounds might be, for example, neodymium neodecanoate, neodymium octanoate or neodymium versalate. The neodymium compounds might be derived from a neodymium carboxylate soap such as, for example Nd(R—C00)$_3$. Representative of aluminum alkyl compounds may be, for example, triisobutylaluminum (TIBA) and diisobutylaluminum hydride (DIBAH). Representative of aluminum chloride delivering compounds may be, for example, diethylaluminum chloride, all so long as the specialized polybutadiene elastomer possesses the aforesaid microstructure, molecular weight and heterogeneity index and Tg ranges.

For this evaluation, a purpose of inclusion of the specialized polybutadiene with its relatively high number average molecular weight, relative low homogeneity index and somewhat low Tg is to promote higher rebound values for the rubber composition which is predictive of less internal heat generation, and therefore less temperature build-up for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to treadwear for a tire with such rubber composition which contains the specialized polybutadiene rubber.

For this evaluation, a purpose of inclusion of the functionalized styrene/butadiene rubber is also to promote higher rebound values for the rubber composition which is predictive of less internal heat generation, and therefore less temperature build-up for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to treadwear for a tire with such rubber composition which contains the specialized polybutadiene rubber.

For this evaluation, a purpose of inclusion of the cis 1,4-polyisoprene rubber in the rubber composition containing the specialized polybutadiene rubber and functionalized butadiene/styrene rubber is to drive the rubber composition's Tg in a direction of a higher Tg to promote improved wet traction for a tire tread of such rubber composition which contains the cis 1,4-polyisoprene rubber, particularly natural rubber.

For this evaluation, a purpose of inclusion of the paraffinic/naphthenic rubber processing oil, which contains a significant amount of from about 30 to about 40 weight naphthenic oil and from about 45 to about 55 weight percent paraffinic oil, with the remainder being aromatics, having a significantly high Tg in a range of from about −40 to about −60° C., as compared to use of a rubber processing oil such as a paraffinic/naphthenic oil which has a higher naphthenic oil content and a significantly lower Tg in a range of from about −70 to about −90° C., is to aid in driving the Tg of the rubber composition in a direction of a higher Tg to promote improved wet traction for a tire tread of such rubber composition which contains the indicated rubber processing oil with the associated relatively high Tg.

For this evaluation, a purpose of inclusion of the silica coupling agent comprised of a bis(3-ethoxysilylpropyl) polysulfide having an average of from about 3.6 to about 4 connecting sulfur atoms in its polysulfidic bridge instead of a silica coupling agent comprised of a bis(3-ethoxysilylpropyl) polysulfide having a reduced average of from about 2.1 to about 2.6 connecting sulfur atoms in its polysulfidic bridge is to increase the effective number of polymer/filler bonds, particularly to increase the rubber/reinforcing filler interaction, and, further, to increase the sulfur content (increase the sulfur level in the rubber composition) by the break-down, and thereby sulfur contribution derived from, the sulfur-containing coupling agent with its significantly higher sulfur content, to promote a tighter cure for the resultant cured rubber composition and to thereby promote higher rebound values for the rubber composition which is predictive of less internal heat generation, and therefore less temperature build-up for the rubber composition when it is being worked and predictive of better (lower) rolling resistance for a tire with a tread of such rubber composition which contains the silica coupling agent with the higher sulfur content. A further purpose is to promote greater abrasion resistance of the rubber composition which is predictive of better resistance to treadwear for a tire with such rubber composition which contains the silica coupling agent with the higher sulfur content.

It is contemplated that the functionalized styrene-butadiene rubber (functionalized SBR) may be prepared, for example, by polymerizing styrene and 1,3-butadiene monomers in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting a deblocking, for example, by hydrolysis or other appropriate procedure. In one embodiment, the styrene-butadiene rubber may be prepared, for example, as disclosed in U.S. Pat. No. 7,342,070 which is hereby referenced herewith in its entirety. In another embodiment, the styrene-butadiene rubber may be prepared, for example, as disclosed in WO 2007/047943.

In practice, a relatively high glass transition temperature (Tg) functionalized SBR with a Tg in a range of from about −10° C. to about −35° C., if the SBR is used, is considered herein to be important to promote tire tread traction, hysteresis, or coefficient of friction, for the rubber composition. It is usually desired herein that the bound styrene content be at least 23 percent, alternatively in a range of from about 10 to about 30 percent, based upon the SBR with a vinyl content in a range of from about 35 to about 45 percent based upon the SBR and contained in its polybutadiene portion, to promote tire tread traction enhancement.

In the practice of this invention, inclusion of the specialized polybutadiene rubber in the rubber composition is provided to evaluate its effect in promoting resistance to abrasion.

The inclusion of the natural cis 1,4-polyisoprene rubber is considered herein to be important in order to drive an increase in the Tg or the rubber composition.

In practice, it is preferred that the elastomers utilized in the rubber composition are exclusive of polymers and copolymers of isobutylene, including halogen modifications thereof.

Examples of reinforcing carbon blacks for elastomers, generally, together with their Iodine number values and DBP (dibutyl phthalate) absorption values, may be found in *The Vanderbilt Rubber Handbook*, (1990), 13th edition, Pages 416 through 419.

In the practice of this invention, use of the combinations of the aforesaid silica and rubber reinforcing carbon black reinforcing fillers in the rubber composition is provided to promote better rolling resistance (less rolling resistance) and improved wet traction for a tire with a tread of such rubber composition which contains such combination of silica and rubber reinforcing carbon black.

The precipitated silicas such as, for example, those obtained by the acidification of a soluble silicate (e.g., sodium silicate or a co-precipitation of a silicate and an aluminate).

The BET surface area of the silica, as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available silicas may be considered for use in this invention such as, for example only and without limitation, silicas commercially available from PPG Industries under the Hi-Sil trademark with designations 210, 243, etc; silicas available from Rhodia, with designations of Zeosil 1165 MP and Zeosil 165GR and silicas available from Degussa AG with designations VN2 and VN3, 3770GR, and from Huber as Zeopol 8745.

When silica reinforcement is used for a rubber tire tread, the silica is conventionally used with a coupling agent to aid in coupling the precipitated silica to the diene-based elastomers.

Compounds capable of reacting with both the silica surface and the rubber elastomer molecule in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber such as, for example, and as hereinbefore mentioned, silane coupling agents containing a polysulfide component, or structure, such as bis-(3-alkoxysilylalkl) polysulfide which contains an average from 2 to about 4 (such as for example a range of from about 2 to about 2.6 or a range of from about 3.6 to about 4) connecting sulfur atoms in its polysulfidic bridge such as, for example, a bis-(3-triethoxysilylpropyl)polysulfide.

However, for this invention, a coupling agent is comprised of a bis-(3-ethoxysilylpropyl)polysulfide material having an average of from about 3.6 to about 4 connecting sulfur atoms in the polysulfide bridge to promote a resultant higher cross-link density for the rubber composition.

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, stearic acid or a zinc stearate, zinc oxide, sulfur-contributing material(s) and vulcanization accelerator(s) as hereinbefore defined.

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and/or palmitic acid normally contained in the stearic acid as typically used. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1 to 5 phr and often in a range of about 1 to about 3 phr; and resins, usually as tackifiers, such as, for example, synthetic hydrocarbon and natural resins typically used in a range of about 1 to 5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of free sulfur added to the rubber composition, in addition to the sulfur generating bis(3-triethoxysilylpropyl)polysulfide coupling agent, is in a range of about 1 to about 5 phr and more generally in a range of about 2 to about 4 phr in order to promote cross-link density of the cured rubber composition; and the accelerator(s), often of the sulfenamide type, may be used, for example, in a range of about 0.5 to about 5 phr and perhaps in a range of about 1 to about 2 phr. The ingredients, including the elastomers but exclusive of sulfur and accelerator curatives, are normally first mixed together in at least one and often in a series of at least two sequential, mixing stage(s), although sometimes one mixing stage might be used, to a temperature in a range of about 130° C. to about 140° C., and such mixing stages are typically referred to as non-productive mixing stages. Thereafter, the sulfur and accelerators, and possibly one or more retarders and one or more antidegradants, are mixed therewith to a temperature of about 90° C. to about 120° C. and is typically referred as a productive mix stage. Such mixing procedure is well known to those having skill in such art.

After mixing, the compounded rubber can be fabricated such as, for example, by extrusion through a suitable die to form a tire component such as, for example, a tire tread strip. The tire tread rubber strip is then typically built onto a sulfur curable tire carcass and the assembly thereof shaped and cured in a suitable mold under conditions of elevated temperature and pressure by methods well-known to those having skill in such art.

The invention may be better understood by reference to the following example in which the parts and percentages are by weight unless otherwise indicated.

EXAMPLE I

Rubber compositions are prepared to evaluate combinations of various ingredients to achieve significant cured rubber properties relating to rebound and abrasion resistance properties.

Predictive tread wet performance properties are to be evaluated such as for example physical properties of lower rebound value at 0° C., which is individually indicative of higher hysteresis of the rubber composition which promotes dampening of the rubber composition for promoting improved, higher, wet traction for a tire tread, and higher tan delta value at −10° C. for the rubber composition, which is also, individually, indicative of improved wet traction for a tire tread, while also presenting suitable physical properties such as abrasion resistance and rebound properties at 23° C. to 100° C.

Therefore, it is desired that the rubber composition has a relatively low rebound value at 0° C. and a relatively high tan delta at −10° C.

Experimental Rubber Sample A was prepared to evaluate promoting indicative wet traction for a tire tread rubber composition (e.g. relatively low rebound values at 0° C. and also relatively high Tan delta values at −10° C.) for the rubber composition).

Experimental rubber Sample B was prepared to evaluate promoting both wet traction and resistance to treadwear (e.g. resistance to abrasion for the rubber composition). It is to be appreciated that for Experimental rubber Sample B, a styrene/alpha-methylstyrene resin added and the rubber composition was adjusted for said specialized polybutadiene rubber used in amount of 22.5 phr, the natural rubber used in an amount of 7.5 phr, the rubber processing oil in an amount of 7.5 phr and the coupling agent composite in an amount of 15.6 phr.

Basic ingredients for the rubber compositions are illustrated in Table 1 and reported in terms of parts by weight per 100 parts rubber (phr) unless otherwise indicated.

The rubber compositions can be prepared by mixing the elastomers(s) without sulfur and sulfur cure accelerators in a first non-productive mixing stage (NP-1) in an internal rubber mixer for about 4 minutes to a temperature of about 140° C. The rubber mixture was then mixed in a second non-productive mixing stage (NP-2) in an internal rubber mixer for about 4 minutes to a temperature of about 140° C. with further addition of ingredients. The rubber mixture was then mixed in a third non-productive mixing stage (NP-3) in an internal rubber mixer for about 4 minutes to a temperature of about 140° C. without further addition of ingredients. The resulting rubber mixture was then mixed in a productive mixing stage (PR) in an internal rubber mixer with sulfur and sulfur cure accelerator(s) being added for about 2 minutes to a temperature of about 110° C. The rubber composition was dumped from each mixer and sheeted out and cooled to below 50° C. between each of the non-productive mixing steps and prior to the productive mixing step.

TABLE 1

| | Experimental Samples | |
|---|---|---|
| Material | A | B |
| Non-productive mixing (NP-1) | | |
| Functionalized SBR rubber[1] | 70 | 70 |
| Natural rubber[2] | 15 | 7.5 |
| Specialized butadiene rubber[3] | 15 | 22.5 |
| Microcrystalline wax | 1.5 | 1.5 |
| Fatty acid[4] | 2 | 2 |
| Naphthenic rubber processing oil[5] | 10 | 7.5 |
| Zinc oxide | 0 | 0 |
| Precipitated silcia[6] | 50 | 50 |
| Non-productive mixing (NP-2) | | |
| Resin[7] | 0 | 5 |
| Antidegradant | 2 | 2 |
| Precipitated silica[6] | 15 | 15 |
| Coupling agent[8] | 10.4 | 15.6 |
| Non-productive mixing (NP-3) | | |
| No ingredients added | | |
| Productive mixing (PR) | | |
| Sulfur | 1.6 | 1 |
| Accelerators[9] | 3.1 | 3.1 |

TABLE 1-continued

| | Experimental Samples | |
|---|---|---|
| Material | A | B |
| Zinc oxide | 1 | 1 |
| Antidegradant | 0.75 | 0.75 |

[1]Functionalized SBR as a solution polymerization prepared styrene/butadiene rubber functionalized with an alkoxysilane group and functional group comprised of a thiol group and having a Tg in a range of from about −30° to about −10° C. as SLR SE4602 ™ from Dow Olefinverbund GmbH;

[2]Natural cis 1,4-polyisoprene natural rubber as SMR-20 having a Tg of about −65° C.

[3]Polybutadiene rubber having a microstructure comprised of about 96 to about 98 percent cis 1,4-isomeric units, about 1 to about 3 percent trans 1,4-isomeric units and about 0.3 to about 1 percent vinyl 1,2-content; a number average molecular weight (Mn) in a range of from about 230,000 to about 250,000 with a heterogeneity index (Mw/Mn) in a range of from about 1.5/1 to about 2/1, and a Tg in a range of from about −104 to about −109° C., as CB25 ™ from Lanxess.

[4]Fatty acid compromised primarily of a combination of stearic acid, oleic and palmitic acid

[5]Rubber processing oil having a Tg of about −50° C. which is a paraffinic/naphthenic oil having a high paraffinic oil content of about 45 to about 55 weight and a naphthenic oil content of about 30 to about 40 percent which might be referred to as being primarily a paraffinic oil of a relatively high Tg.

[6]As Zeosil 1165 MP ™ from Rhodia

[7]Styrene/alphamethylstyrene resin as Eastman Resin 2336 ™ from the Eastman Chemical company to promote wet traction having a softening point (Sp) of about 85° C. and a styrene content of about 20 percent.

[8]A 50/50 (by weight) composite of carbon black and bis-(3-triethoxysilylpropyl) poly sulfide having an average in a range of from about 3.6 to about 4 connecting sulfur atoms in its polysulfidic bridge from Evonic Degussa, identified as Si69 ™ and reported in the Table as the composite.

[9]Accelerators as a combination of sulfenamide and diphenylguanidine

The prepared rubber compositions were cured at a temperature of about 160° C. for about 14 minutes and the resulting cured rubber samples evaluated for various physical properties (rounded numbers are reported herein) as shown in the following Table 2.

TABLE 2

| | Experimental Samples | |
|---|---|---|
| Material | A | B |
| Functionalized SBR rubber | 70 | 70 |
| Natural rubber | 15 | 7.5 |
| Specialized polybutadiene rubber | 15 | 22.5 |
| Naphthenic rubber processing oil | 10 | 7.5 |
| Precipitated silica | 65 | 65 |
| Resin | 0 | 5 |
| Coupling agent | 10.4 | 15.6 |
| Properties | | |
| RPA[1] | | |
| Uncured G', 0.83 Hz, 100° C., 15% strain (MPa) | 0.32 | 0.34 |
| Cured G', 11 Hz, 40° C., 1% strain (Mpa) | 4.02 | 2.83 |
| Tan delta, 11 Hz, 40° C., 1% strain | 0.08 | 0.098 |
| Cured G', 11 Hz, 100° C., 10% strain (Mpa) | 2.2 | 1.76 |
| Tan delta, 11 Hz, 100° C., 10% strain | 0.09 | 0.08 |
| Tan delta, 11 Hz, −10° C., 0.5% strain | 0.43 | 0.39 |
| ATS[2], stress-strain | | |
| Tensile strength (MPa) | 17.63 | 17.81 |
| Elongation at break (%) | 409 | 407 |
| 300% modulus, ring, (MPa) | 12.64 | 12.65 |
| Rebound value(Zwick) | | |
| 0° C. | 15 | 18.4 |
| ATS[2] Rebound value | | |
| 23° C. | 44 | 49.5 |
| 100° C. | 70 | 71.6 |
| Shore A Hardness | | |
| 23° C. | 68 | 64 |
| 100° C. | 63 | 60 |

TABLE 2-continued

|  | Experimental Samples | |
|---|---|---|
| Material | A | B |
| Abrasion rate (mg/km), Grosch[3] | | |
| Medium (40N), 6° slip angle, speed = 20 km/hr, distance = 1,000 meters | 49.75 | 36 |

[1]Rubber process analyzer instrument (e.g. Rubber Process Analyzer RPA 2000)
[2]Automated Testing System instrument by Instron for determining ultimate tensile strength, ultimate elongation, modulii, etc, of rubber samples
[3]The Grosch abrasion rate run on a LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). Frictional forces, both lateral and circumferential, generated by the abrading sample can be measured together with the load (Newtons) using a custom tri-axial load cell. The surface temperature of the abrading wheel is monitored during testing and reported as an average temperature.

In practice, a Low abrasion severity test may be run, for example, at a load of 20 Newtons at a slip angle of 2 degrees and a disk speed of 20 or 40 kph (kilometers per hour) at a sample travel of 7,500 m. A Medium abrasion severity test may be run, for example, at a load of 40 Newtons at a slip angle of 6 degrees and a disk speed of 20 kph and a sample travel of 1,000 m. A High abrasion severity test may be run, for example, at a load of 70 Newtons at a slip angle of 12 degrees and a disk speed of 20 kph and a sample travel of 250 m.

From Table 2 it is seen that Experimental rubber Sample A had a 0° C. Zwick rebound value of 15 and a −10° C. tan delta value of 0.43 (at 11 Hz, 0.5% strain) which are considered herein to be independently indicative of a tire tread of suitable wet skid resistance for a tire tread of such rubber composition.

From Table 2 it can also be seen that Experimental rubber Sample B had a 0° C. Zwick rebound value of 18.4 and a −10° C. tan delta value of 0.39 (at 11 Hz, 0.5% strain) which are also considered herein to be independently indicative of a tire tread of suitable wet skid resistance for a tire tread of such rubber composition.

It can additionally be seen from Table 2 that the 40° C. tan delta value (at 11 Hz, 1% strain) of 0.08 for Experimental rubber Sample A and 0.098 for Experimental rubber Sample B, respectively, were substantially the same.

It can further be seen from Table 2 that the Grosch abrasion rate of 36 (mg/km) for Experimental rubber Sample B was significantly and beneficially lower than the Grosch abrasion rate of 49.75 for Experimental rubber Sample A.

It is to be appreciated that Experimental rubber Samples A and B which utilized a combination of functionalized SBR, specialized polybutadiene rubber of a defined microstructure, molecular weight and heterogeneity index, as well as a relatively high Tg promoting rubber processing oil and a higher Tg promoting natural rubber together with a precipitated silica/coupling agent combination where the coupling agent had polysulfidic component with an average in a range of from about 3 to about 4 connecting sulfur content.

It is believed that this evaluated combination of ingredients contributed to aforesaid beneficial physical properties relative to indicative tire tread wet traction.

The 40° C. tan delta values for Experimental rubber Samples A and B were substantially the same which is indicative of the same or similar tire tread rolling resistance of a tire of such rubber composition(s).

Therefore, it is considered herein that the rubber compositions of evaluated Experimental rubber Samples A and B did not significantly detract from an indicative tire tread rolling resistance.

The 23° C. rebound value of 44 for Experimental rubber Sample A was significantly less than the 23° C. rebound value of 49.5 for Experimental rubber Sample B, which further contained the styrene/alpha-methylstyrene resin which is indicative of improved (reduced) rolling resistance.

The Grosch abrasion rate of 36 (mg/km) for Experimental rubber Sample B, which contained the styrene/alpha-methylstyrene resin, was significantly lower than the Grosch abrasion rate of 49.8 for Experimental rubber Sample A, thereby indicating that the modified formulation, including the styrene/alpha-methylstyrene resin beneficially contributed to the abrasion resistance of the rubber composition of Experimental rubber Sample B.

CONCLUSIONS

It is concluded that this evaluation indicates that the Experimental rubber Samples A and B provided rubber compositions that are indicative of suitable wet traction for a tire tread of such rubber compositions, thereby a predictive relatively short stopping distance for wet road conditions, while having a suitable physical property such as rolling resistance for a tire with a tread of such rubber composition and resistance to abrasion.

It further concluded from this evaluation that the increased amount of silica coupling agent for Experimental rubber Sample B worked to enhance the silica filler/elastomer network of the rubber composition and thereby promote an increased resistance to abrasion to balance the inclusion of the small amount of the styrene/alpha-methylstyrene resin added to promote wet traction.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon parts by weight per 100 parts by weight of rubber (phr):
   (A) elastomers comprised of:
      (1) from about 50 to about 80 phr of a solution polymerization prepared styrene/butadiene rubber (SBR) functionalized with functional groups consisting of alkoxysilane and thiol groups and having a Tg in a range of from about −40 to about −10° C.;
      (2) from about 10 to about 40 phr of polybutadiene rubber;
      (3) about 5 to about 40 phr of cis 1,4-polyisoprene rubber having a Tg in a range of about −65 to about −70° C.;
   (B) about 5 to about 20 phr of naphthenic rubber processing oil having a Tg in a range of from about 80 to about 90° C.;
   (C) about 40 to about 110 phr of reinforcing filler comprised of:
      (1) amorphous rubber reinforcing precipitated silica filler, as precipitated silica, or
      (2) combination of said precipitated silica and rubber reinforcing carbon black where said filler contains from about 55 to about 75 weight percent of said rubber reinforcing carbon black,
      (3) combination of said precipitated silica and rubber reinforcing carbon black where said filler contains up to 25 weight percent of said rubber reinforcing carbon black, or
      (4) combination of said precipitated silica and rubber reinforcing carbon black where said filler contains from about 15 to about 50 weight percent of said rubber reinforcing carbon black;

(D) coupling agent having a moiety reactive with hydroxyl groups contained on the surface of said precipitated silica and another moiety interactive with at least one of said elastomers, wherein said coupling agent is comprised of a bis-(3-ethoxysilylpropyl) polysulfide material having an average of from about 2 to about 4 connecting sulfur atoms in the polysulfide bridge;

wherein said polybutadiene rubber is a cis 1,4-polybutadiene rubber which has a microstructure comprised of about 96 to about 98 percent cis 1,4-isomeric units, about 1 to about 3 percent trans 1,4-isomeric units and about 0.3 to about 1 percent vinyl 1,2-content; a number average molecular weight (Mn) in a range of from about 230,000 to about 250,000 with a heterogeneity index (Mw/Mn) in a range of from about 1.5/1 to about 2/1, and a Tg in a range of from about −104 to about −109° C.;

wherein said functionalized styrene/butadiene rubber (SBR) has a bound styrene content in a range of from about 10 to about 50, or about 10 to about 30, percent based on the SBR and a vinyl content in a range of from about 35 to about 45 percent based on the SBR and contained in its polybutadiene portion.

2. The rubber composition of claim 1 wherein said rubber composition further contains from about 2 to about 15 phr of styrene/alphamethylstyrene resin and where said the cis 1,4-polybutadiene rubber is used in amount ranging from about 15 to about 25 phr, said cis 1,4-polyisoprene rubber is used in an amount ranging from about 5 to about 10 phr and the rubber processing oil is used in an amount ranging from about 5 to about 10 phr, wherein said styrene/alphamethylstyrene copolymer resin has a softening point (Sp) in a range of from about 80 to about 90° C. with a styrene content in a range of from about 10 to about 30 percent.

3. The rubber composition of claim 1 wherein said coupling agent is agent is comprised of a bis-(3-ethoxysilylpropyl) polysulfide material having an average of from about 3.6 to about 4 connecting sulfur atoms in the polysulfide bridge.

4. A pneumatic rubber tire having a component comprised of a rubber composition comprised of, based upon parts by weight per 100 parts by weight of rubber (phr):

(A) elastomers comprised of:
(1) from about 50 to about 80 phr of a solution polymerization prepared styrene/butadiene rubber functionalized with functional groups consisting of alkoxysilane and thiol groups and having a Tg in a range of from about −40 to about −10° C.;
(2) from about 10 to about 40 phr of polybutadiene rubber;
(3) about 5 to about 40 phr of cis 1,4-polyisoprene rubber having a Tg in a range of about −65 to about −70° C.;

(B) about 5 to about 20 phr of naphthenic rubber processing oil having a Tg in a range of from about 80 to about 90° C.;

(C) about 40 to about 110 phr of reinforcing filler comprised of:
(1) amorphous rubber reinforcing precipitated silica filler, as precipitated silica, or
(2) combination of said precipitated silica and rubber reinforcing carbon black where said filler contains from about 55 to about 75 weight percent of said rubber reinforcing carbon black, or
(3) combination of said precipitated silica and rubber reinforcing carbon black where said filler contains up to 25 weight percent of said rubber reinforcing carbon black, or
(4) combination of said precipitated silica and rubber reinforcing carbon black where said filler contains from about 15 to about 50 weight percent of said rubber reinforcing carbon black;

(D) coupling agent having a moiety reactive with hydroxyl groups contained on the surface of said precipitated silica and another moiety interactive with at least one of said elastomers, wherein said coupling agent is comprised of a bis-(3-ethoxysilylpropyl) polysulfide material having an average of from about 2 to about 4 connecting sulfur atoms in the polysulfide bridge;

wherein said polybutadiene rubber is a cis 1,4-polybutadiene rubber which has a microstructure comprised of about 96 to about 98 percent cis 1,4-isomeric units, about 1 to about 3 percent trans 1,4-isomeric units and about 0.3 to about 1, a number average molecular weight (Mn) of from about 230,000 to about 250,000 with a heterogeneity index (Mw/Mn) in a range of from about 1.5/1 to about 2/1, and a Tg in a range of from about −104 to about −109° C.;

wherein said functionalized styrene/butadiene rubber (SBR) has a bound styrene content in a range of from about 10 to about 30 percent based on the SBR, and a vinyl content in a range of from about 35 to about 45 percent based on the SBR and contained in its polybutadiene portion.

5. The tire of claim 4 wherein said rubber composition contains from about 2 to about 15 phr of styrene alphamethylstyrene resin having a softening point (Sp) in a range of from about 80 to about 90° C. and a styrene content in a range of from about 10 to about 30 percent.

6. The tire of claim 5 wherein said rubber composition contains said polybutadiene rubber in amount ranging from about 15 to about 25 phr, said cis 1,4-polyisoprene rubber in an amount ranging from about 5 to about 10 phr and said rubber processing oil in an amount ranging from about 5 to about 10 phr.

7. The tire of claim 4 wherein said component is a tire tread.

8. The tire of claim 5 wherein said component is a tire tread.

9. The tire of claim 6 wherein said component is a tire tread.

10. The tire of claim 6 wherein said functionalized styrene-butadiene rubber is obtained by copolymerizing styrene and 1,3-butadiene characterized by having a thiol group and an alkoxysilyl group bonded to the polymer chain.

11. The tire of claim 10 wherein said alkoxysilyl group is comprised of at least one of methoxysilyl group and ethoxysilyl group.

12. The tire of claim 10 wherein said thiol group is bonded to any of a polymerization initiating terminal, a polymerization terminating terminal, a main chain of the styrene/butadiene rubber and as a side chain of the styrene/butadiene rubber, as long as the group is bonded to the styrene-butadiene rubber chain.

13. The tire of claim 10 wherein the content of the alkoxysilyl group bonded to the polymer chain of the styrene/butadiene rubber is from about 0.5 to about 200 mmol/kg of the styrene/butadiene rubber.

14. The tire of claim 10 wherein the alkoxysilyl group is be bonded to any of the polymerization initiating terminal, the polymerization terminating terminal, the main chain of the styrene/butadiene rubber and the side chain to the styrene/butadiene rubber, as long as it is bonded to the styrene/butadiene rubber's polymer chain.

15. The tire of claim 4 wherein said functionalized styrene/butadiene rubber is produced by polymerizing styrene and butadiene in a hydrocarbon solvent by anionic polymerization using an organic alkali metal and/or an organic alkali earth metal as an initiator, adding a terminating agent compound having a thiol group protected with a protecting group and an alkoxysilyl group to react it with a living polymer chain terminal at the time when the polymerization has substantially completed, and then conducting deblocking of the protective group.

16. The tire of claim 6 wherein said polybutadiene elastomer is prepared by polymerization of 1,3-polybutadiene monomer in an organic solvent solution in the presence of a catalyst comprised of neodymium compound, aluminum alkyl and an aluminum chloride delivering compound, and by treating the reaction mixture with disulfur dichloride so long as it possesses the aforesaid microstructure, molecular weight and heterogeneity index and Tg ranges;
    wherein mentioned said neodymium compound is comprised of neodymium neodecanoate, neodymium octanoate or neodymium versalate, said aluminum alkyl compound is comprised of triisobutylaluminum (TIBA) or diisobutylaluminum hydride (DIBAH) and said aluminum chloride delivering compounds is comprised of diethylaluminum chloride, so long as the specialized polybutadiene elastomer possesses the aforesaid microstructure, molecular weight and heterogeneity index and Tg ranges.

* * * * *